(12) United States Patent
Hendrickson

(10) Patent No.: US 11,653,780 B2
(45) Date of Patent: May 23, 2023

(54) ELECTRICAL CORD RECEIVING ANTI-FATIGUE MAT ASSEMBLY AND METHOD

(71) Applicant: Arnold Hendrickson, Farmington, MN (US)

(72) Inventor: Arnold Hendrickson, Farmington, MN (US)

( * ) Notice: Subject to any disclaimer, the term of this patent is extended or adjusted under 35 U.S.C. 154(b) by 90 days.

(21) Appl. No.: 17/139,667

(22) Filed: Dec. 31, 2020

(65) Prior Publication Data

US 2022/0202222 A1 Jun. 30, 2022

(51) Int. Cl.
*A47G 27/00* (2006.01)
*A47G 27/02* (2006.01)
*H02G 3/38* (2006.01)

(52) U.S. Cl.
CPC ......... *A47G 27/0231* (2013.01); *H02G 3/283* (2013.01)

(58) Field of Classification Search
None
See application file for complete search history.

(56) References Cited

U.S. PATENT DOCUMENTS

| 2,512,310 | A | * | 6/1950 | Corson | A47G 27/0231 |
| | | | | | D6/583 |
| 6,237,198 | B1 | | 5/2001 | Jimenez | |
| 6,499,410 | B1 | | 12/2002 | Berardi | |
| 6,599,615 | B2 | | 7/2003 | Burke, III | |
| 7,203,412 | B2 | | 4/2007 | Moore | |
| 8,791,363 | B2 | | 7/2014 | Lubanski | |
| 9,089,755 | B2 | | 7/2015 | Holland | |
| 10,383,470 | B2 | * | 8/2019 | Weih | H04L 63/10 |
| 10,582,793 | B1 | | 3/2020 | McMahan | |
| 2009/0090537 | A1 | | 4/2009 | Nunes | |

FOREIGN PATENT DOCUMENTS

| CN | 201286591 | 12/2009 |
| CN | 105455588 | 4/2016 |
| KR | 1787395 | 10/2017 |
| WO | WO2017223445 | 12/2017 |

* cited by examiner

*Primary Examiner* — Alexander S Thomas

(57) ABSTRACT

An electrical cord receiving anti-fatigue mat assembly includes a panel that has a top side, a bottom side and a perimeter edge. The panel is comprised of a resiliently compressible material. The bottom side has a trough therein with the trough having a pair of ends each comprising an opening extending through the perimeter edge. The trough receives an electrical cord such that the bottom side abuts and is flush with a floor surface when the electrical cord is positioned within the trough and extends through each of the openings. The trough has a depth and width each being greater than 0.40 inches.

12 Claims, 6 Drawing Sheets

ELECTRICAL CORD RECEIVING ANTI-FATIGUE MAT ASSEMBLY AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to anti-fatigue mat device and more particularly pertains to a new anti-fatigue mat device for allowing the passage of elongated members thereunder so that the electrical cord does not affect the top side of the mat. The elongated members may include articles commonly found in processing and manufacturing plants such as electrical cords, compressed airlines, data cables, hydraulic lines, water lines and the like.

(2) Description of Related Art Including Information Disclosed Under 37 CFR 1.97 and 1.98

The prior art relates to anti-fatigue mat devices which are typically used by workers who are required to stand for several hours on a hard surface such as on concrete in a manufacturing or sorting warehouse. Such tasks are often performed adjacent to electrically powered equipment requiring power cords which may be positioned adjacent to the feet of the worker. The prior art provides for anti-fatigue mats upon which the workers stand to prevent soreness to worker's feet and legs to reduce fatigue associated with standing in one area for several hours. However, the electrical cords, or analogous data conduits or other wiring, are often routed under the anti-fatigue mats when required to reach equipment and electrical outlets. The electrical cord creates an elongated raised area in a top side of the mat opposite of the electrical cord. This raised area, or hump, is uncomfortable for the worker to stand on.

BRIEF SUMMARY OF THE INVENTION

An embodiment of the disclosure meets the needs presented above by generally comprising a panel that has a top side, a bottom side and a perimeter edge. The panel is comprised of a resiliently compressible material. The bottom side has a trough therein with the trough having a pair of ends each comprising an opening extending through the perimeter edge. The trough receives an electrical cord such that the bottom side abuts and is flush with a floor surface when the electrical cord is positioned within the trough and extends through each of the openings. The trough has a depth and width each being greater than 0.40 inches.

In another embodiment, a method is provided which includes positioning an electrical cord on a floor surface. A panel is placed on the electrical cord, wherein the panel has a top side, a bottom side and a perimeter edge. The panel is comprised of a resiliently compressible material. The bottom side has a trough therein and has a pair of ends each comprising an opening extending through the perimeter edge. The trough has a depth and width each greater than 0.40 inches. The electrical cord is positioned in the trough such that the electrical cord extends through the ends of the trough and the bottom side abuts, and is flush with, the floor surface adjacent to the trough.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
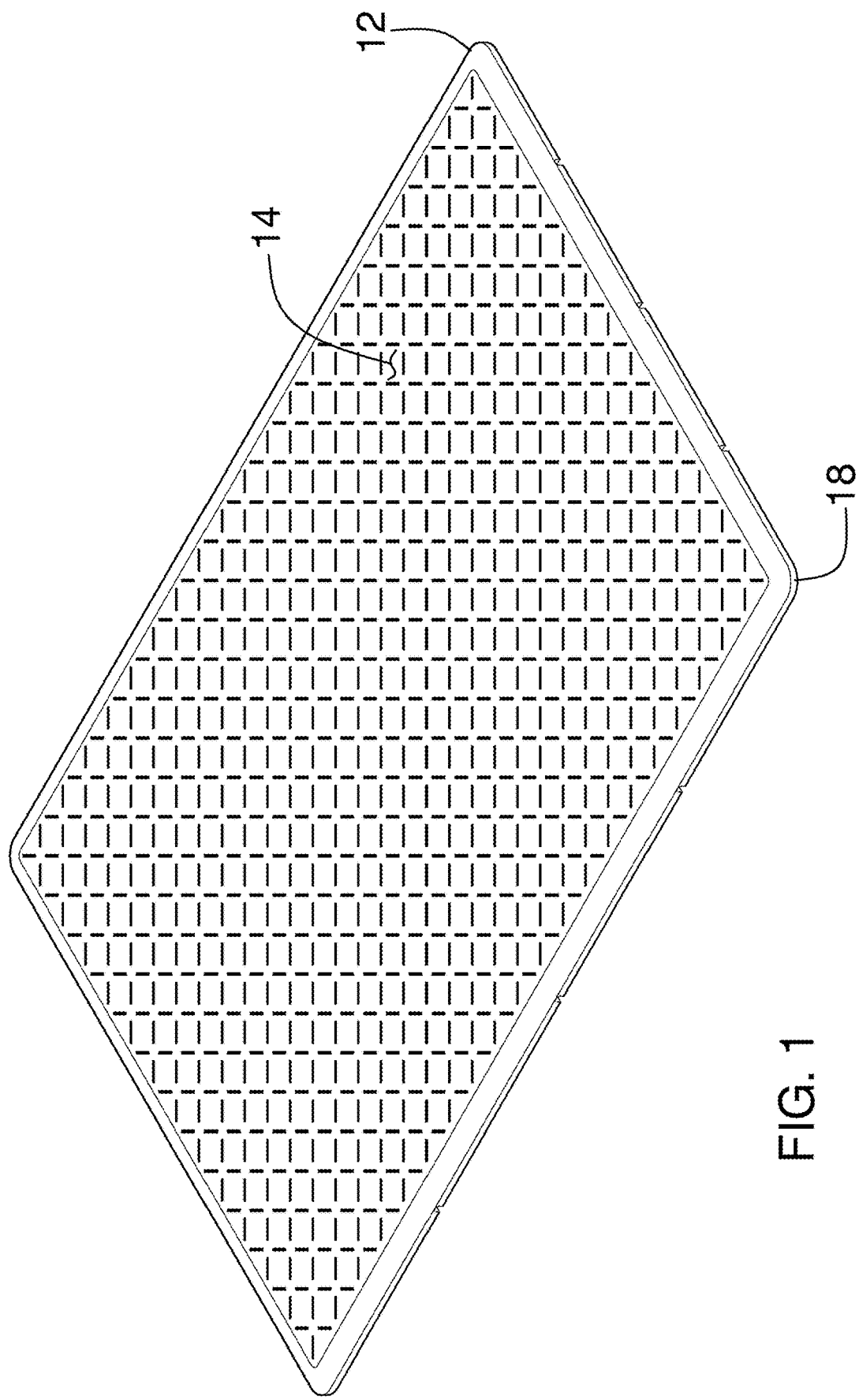
FIG. 1 is a top isometric view of an electrical cord receiving anti-fatigue mat assembly and method according to an embodiment of the disclosure.
Figure 2:
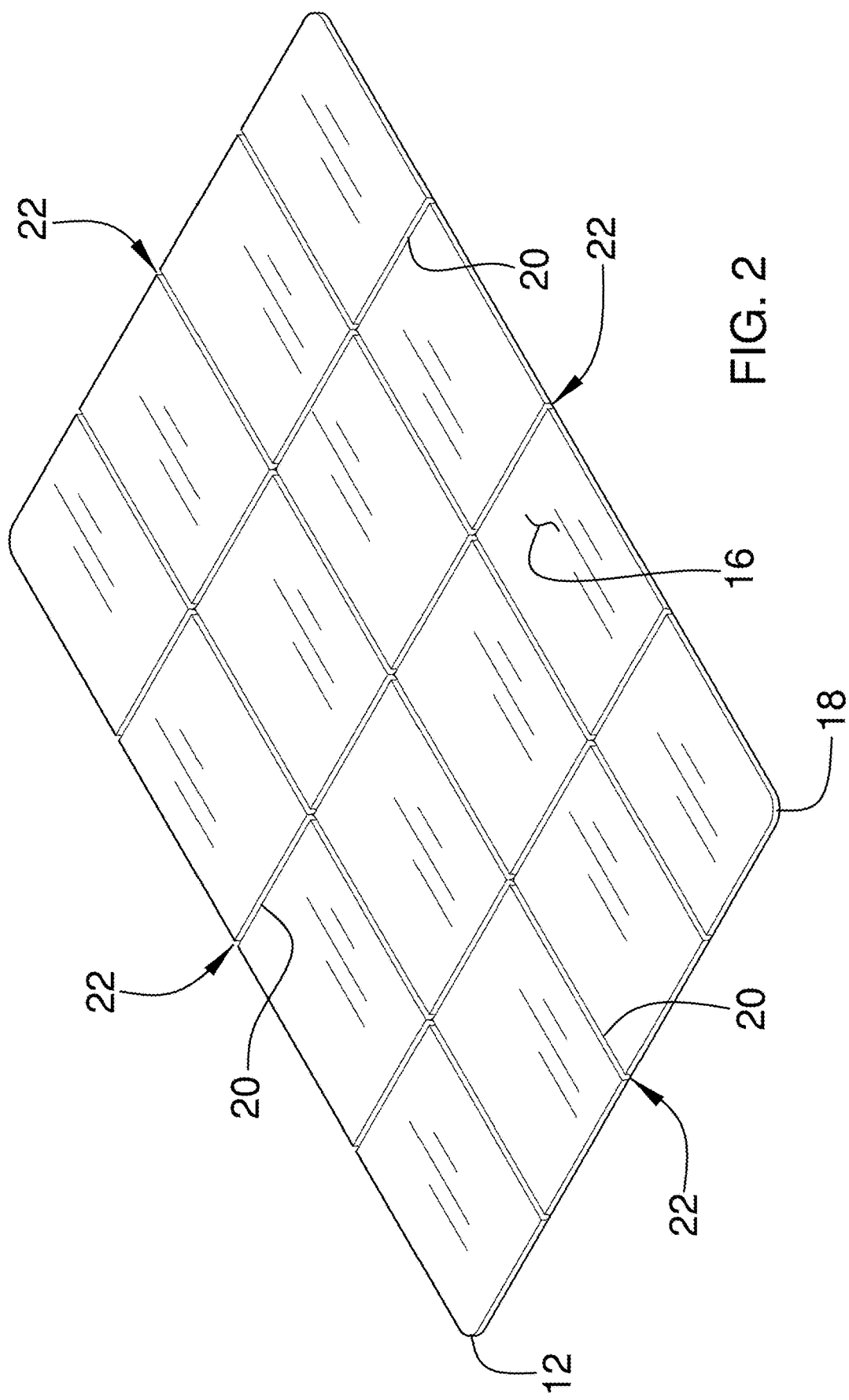
FIG. 2 is a bottom isometric view of an embodiment of the disclosure.
Figure 3:
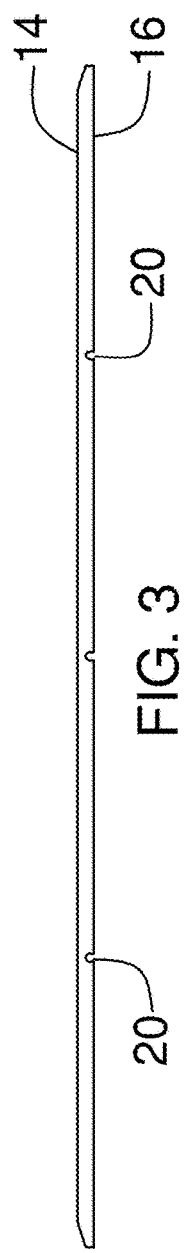
FIG. 3 is a front view of an embodiment of the disclosure.
Figure 4:
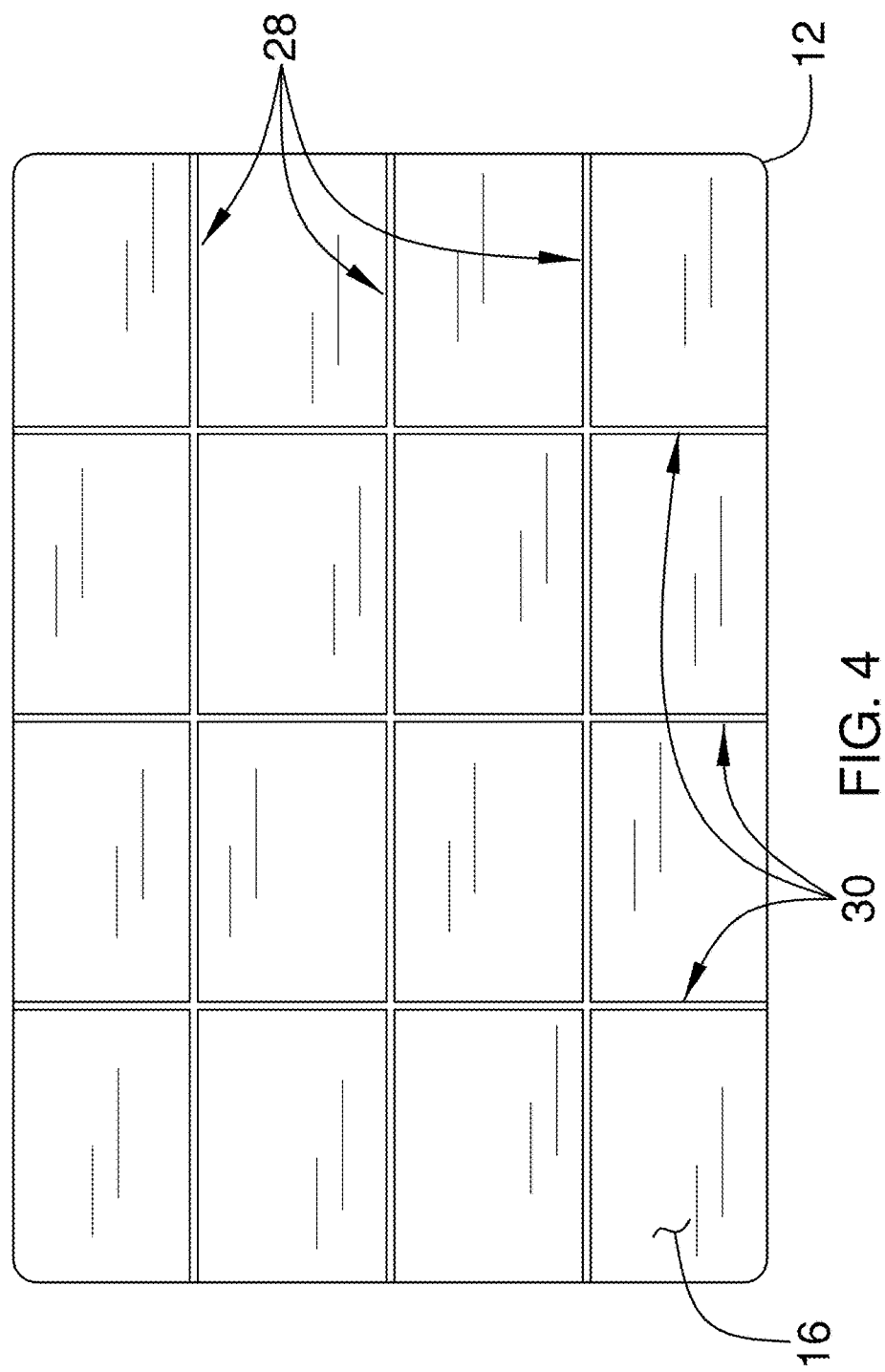
FIG. 4 is a bottom view of an embodiment of the disclosure.
Figure 5:
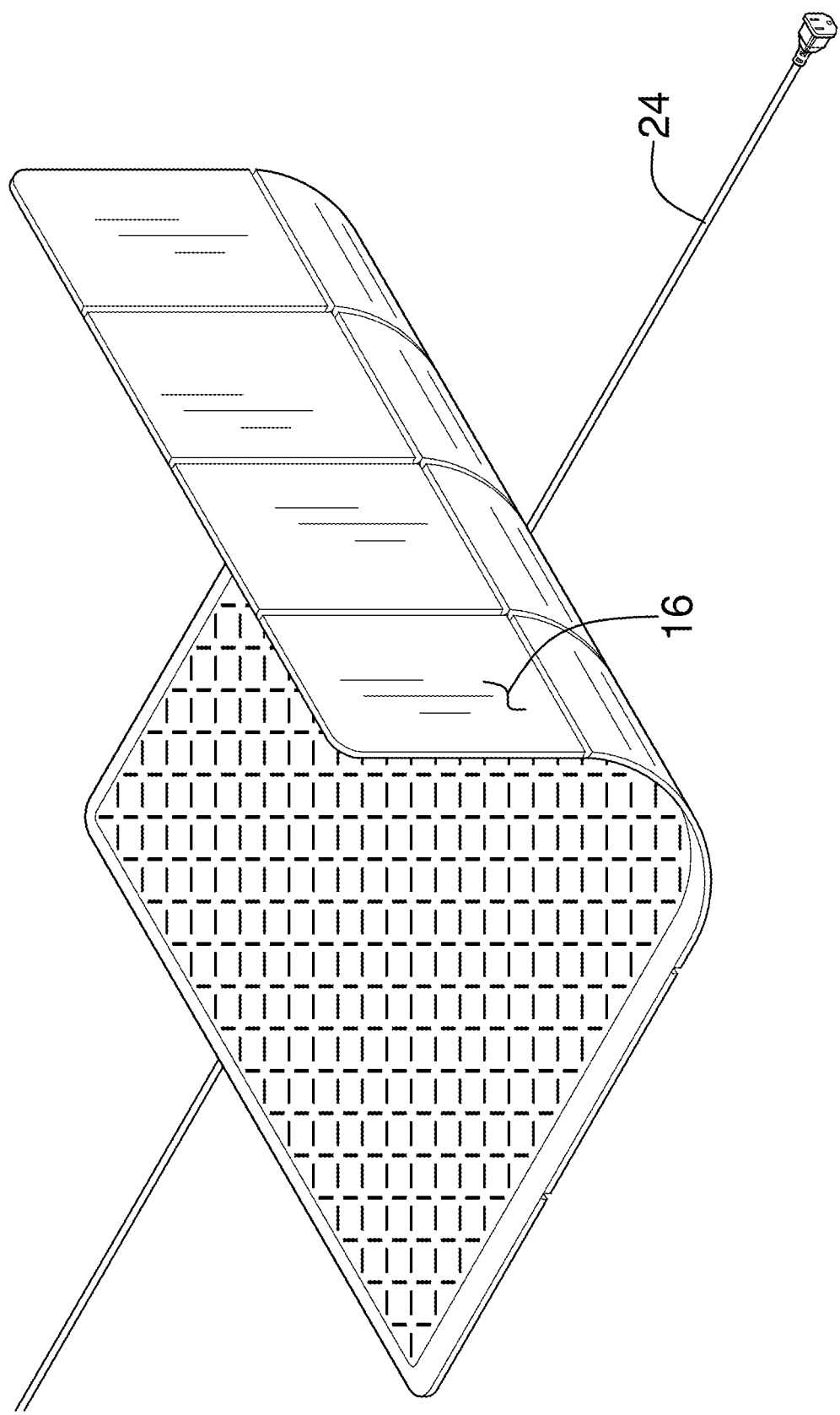
FIG. 5 is a top isometric in-use view of an embodiment of the disclosure.
Figure 6:
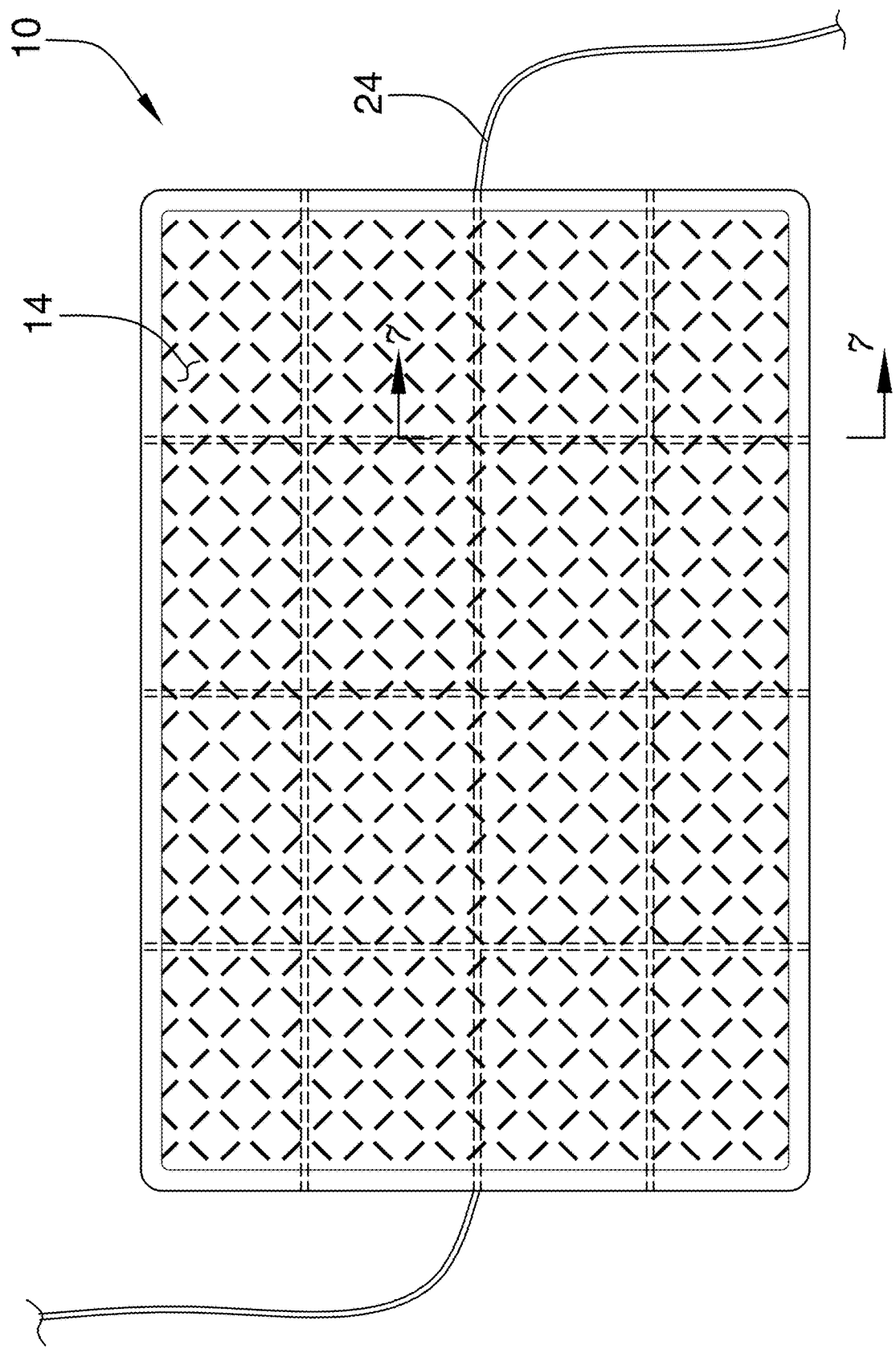
FIG. 6 is a top in-use view of an embodiment of the disclosure.
Figure 7:
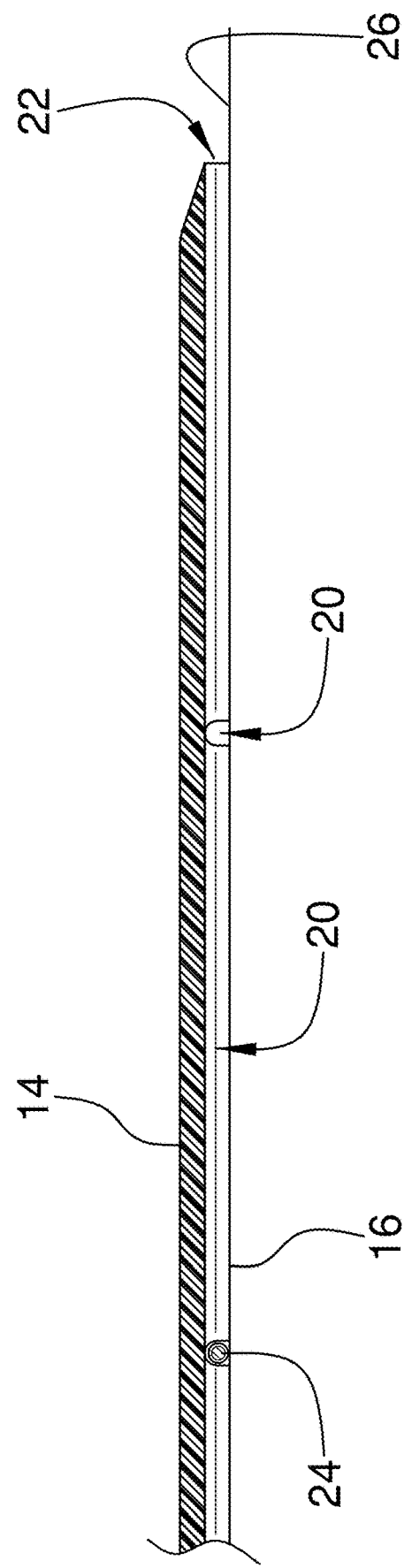
FIG. 7 is a cross-sectional view of an embodiment of the disclosure taken along line 7-7 of FIG. 6.

With reference now to the drawings, and in particular to FIGS. 1 through 7 thereof, a new anti-fatigue mat device embodying the principles and concepts of an embodiment of the disclosure and generally designated by the reference numeral 10 will be described.

As best illustrated in FIGS. 1 through 7, the electrical cord receiving anti-fatigue mat assembly and method 10 generally comprises a panel 12 that has a top side 14, a bottom side 16 and a perimeter edge 18. The panel 12 is comprised of a resiliently compressible material. The panel 12 may be comprised of materials conventional to anti-fatigue mats such as foam, rubber, gel, and the like and is generally a conventionally constructed anti-fatigue mat. The panel 12 has a length and width each being greater than 1.5 feet wherein the top side 14 has an area greater than 4.0 ft². More typically the panel 12 will have size equal to greater than 6.0 ft². The panel 12 has a depth from the top side 14 to the bottom side 16 that is equal or greater than 0.5 inches and will more typically be greater than 0.75 inches.

The bottom side 16 of the panel has a trough 20 therein. The trough 20 has a pair of ends each comprising an opening 22 extending through the perimeter edge 18. The trough 20 is configured to receive an electrical cord 24 such that the bottom side 18 abuts and is flush with a floor surface 26 when the electrical cord 24 is positioned within the trough 20 and extends through each of the openings 22. The electrical cord 24 may comprise a power cord for equipment, extension cords, data conduits, and the like and may further comprise hardened tubular conduits. This would prevent a bulge in the top side 14 corresponding to and opposite of the position of the electrical cord 24. The trough 20 has a depth and width each being greater than 0.40 inches and each being typically less than 0.75 inches. The trough 20 extends along a straight line.

In some embodiments the trough 20 is one of a plurality of troughs 20 positioned in the bottom side 16. In such embodiments, the troughs 20 may each be linear, terminate with a pair of openings 22 extending through the perimeter edge 18, and have a same depth and width with respect to each other. The troughs 20 may comprise a plurality of longitudinal troughs 28 being spaced from and oriented parallel to each other. The assembly 10 may further include a plurality of latitudinal troughs 30. The latitudinal troughs 30 are oriented perpendicular to and extend through the longitudinal troughs 28. The latitudinal troughs 30 are spaced from each other. Alternatively, an embodiment may include a single longitudinal trough 28 and a single latitudinal trough 30 which intersect each other. Embodiments may be provided wherein the troughs 20 are curved for custom projects.

Alternate embodiments, not shown, may include openings extending through the top side 14 which extend into the trough 20 to allow electrical cords 24, or other elongated members as described above, to move through the panel 12. In one example an airline could include a splice to allow a portion of the airline to extend through the panel 12.

While the above describes troughs 20 that extend either along the width or along the length of the panel 12, the troughs 20 may be provided at angles not equal to 90° with respect to straight edges of the panel 12. Thus, the trough 20 may be positioned and oriented as needed for particular tasks. The troughs 20 may also be provided with different widths and depths with respect to each other to accommodate electrical cords 24 of different sizes.

In use, the assembly 10 may be utilized as a conventional anti-fatigue mat. However, the assembly 10 includes one or more troughs 20 such that when an electrical cord 24 positioned on a floor surface 26 is positioned in the trough 20, the trough 20 prevents any bulging in the top side 14 opposite of the electrical cord 24 as would be the case with a conventional anti-fatigue mat. Should the assembly 10 include a plurality of the troughs 20, the user would select the trough 20 that was most useful for the location of the panel 12 and the electrical cord. Once the electrical cord 24 is within the trough 20, the bottom side 16 of the panel 12 will lie flush against the floor surface 26, particularly in areas adjacent to the selected trough 20. In this way, the electrical cord 24 will not create a raised area of discomfort for the user of the panel 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An anti-fatigue mat assembly comprising:

a panel having a top side, a bottom side and a perimeter edge, the panel being comprised of a resiliently compressible material; and the bottom side having a trough therein, the trough having a pair of ends each comprising an opening extending through the perimeter edge, the trough being configured to receive an electrical cord such that the bottom side abuts and is flush with a floor surface when the electrical cord is positioned within the trough and extends through each of the openings, the trough having a depth and width each being greater than 0.40 inches, wherein the trough extends along a straight line, the trough terminating with a pair of openings extending through the perimeter edge, the trough having a cross sectional shape perpendicular to a longitudinal axis of the trough having a hemispherical surface extending between parallel side surfaces.

2. The anti-fatigue mat assembly according to claim 1, wherein the panel has a length and width each being greater than 1.5 feet, the top side having an area greater than 4.0 ft², the panel having a depth from the top side to the bottom side being equal or greater than 0.5 inches.

3. The anti-fatigue mat assembly according to claim 1, wherein the trough is one of a plurality of troughs each extending along a straight line and having a same depth and width with respect to each other.

4. The anti-fatigue mat assembly according to claim 3, wherein the plurality of troughs includes a plurality of longitudinal troughs being spaced from and oriented parallel to each other.

5. The anti-fatigue mat assembly according to claim 4, wherein the plurality of troughs includes a plurality of latitudinal troughs is oriented perpendicular to and extends through the longitudinal troughs, the latitudinal troughs being spaced from each other.

6. A method of providing a cushioned standing surface over an electrical cord, the method comprising the steps of:

positioning an electrical cord on a floor surface;

placing a panel on the electrical cord, the panel having a top side, a bottom side and a perimeter edge, the panel being comprised of a resiliently compressible material, the bottom side having a trough therein, the trough being straight and having a pair of ends each comprising an opening extending through the perimeter edge, the trough having a depth and width each being greater than 0.40 inches, the trough having a cross sectional shape perpendicular to a longitudinal axis of the trough having a hemispherical surface extending between parallel side surfaces; and positioning the electrical cord in the trough such that the electrical cord extends through the ends of the trough and the bottom side abuts and is flush with the floor surface adjacent to the trough.

7. The method of providing a cushioned standing surface over an electrical cord according to claim 6, wherein the step the panel has a length and width each being greater than 1.5 feet, the top side having an area greater than 4.0 ft², the panel having a depth from the top side to the bottom side being equal or greater than 0.5 inches.

8. The method of providing a cushioned s ding surface over an electrical cord according to claim 6, wherein:

the trough is one of a plurality of troughs each extending along a straight line, terminating with a pair of openings extending through the perimeter edge, and having a same depth and width with respect to each other; and wherein the step of positioning the electrical cord in the trough includes the selecting of one of the plurality of troughs to position the electrical cord therein.

9. The method of providing a cushioned standing surface over an electrical cord according to claim 8, wherein the plurality of troughs includes a plurality of longitudinal troughs being spaced from and oriented parallel to each other.

10. The method of providing a cushioned standing surface over an electrical cord according to claim 9, wherein the plurality of troughs includes a plurality of latitudinal troughs is oriented perpendicular to and extends through the longitudinal troughs, the latitudinal troughs being spaced from each other.

11. The method of providing a cushioned standing surface over an electrical cord according to claim 10, wherein the step the panel has a length and width each being greater than 1.5 feet, the top side having an area greater than 4.0 ft², the panel having a depth from the top side to the bottom being equal or greater than 0.5 inches.

12. An anti-fatigue mat assembly comprising:

a panel having a top side, a bottom side and a perimeter edge, the panel being comprised of a resiliently compressible material, the panel having a length and width each being greater than 1.5 feet, the top side having an area greater than 4.0 ft², the panel having a depth from the top side to the bottom side being equal or greater than 0.5 inches;

the bottom side having a trough therein, the trough having a pair of ends each comprising an opening extending through the perimeter edge, the trough being configured to receive an electrical cord such that the bottom side abuts and is flush with a floor surface when the electrical cord is positioned within the trough and extends through each of the openings, the trough having a depth and width each being greater than 0.40 inches, the trough extending along a straight line, the trough having a cross sectional shape perpendicular to a longitudinal axis of the trough having a hemispherical surface extending between parallel side surfaces; and the trough being one of a plurality of troughs each being linear, terminating with a pair of openings extending through the perimeter edge, and having a same depth and width with respect to each other, the plurality of troughs including a plurality of longitudinal troughs being spaced from and oriented parallel to each other, the plurality of troughs including a plurality of latitudinal troughs being oriented perpendicular to and extending through the longitudinal troughs, the latitudinal troughs being spaced from each other.

\* \* \* \* \*